April 13, 1926.
J. H. WAGENHORST
1,580,979
RIM BASE AND DETACHABLE RING
Filed Jan. 19, 1923
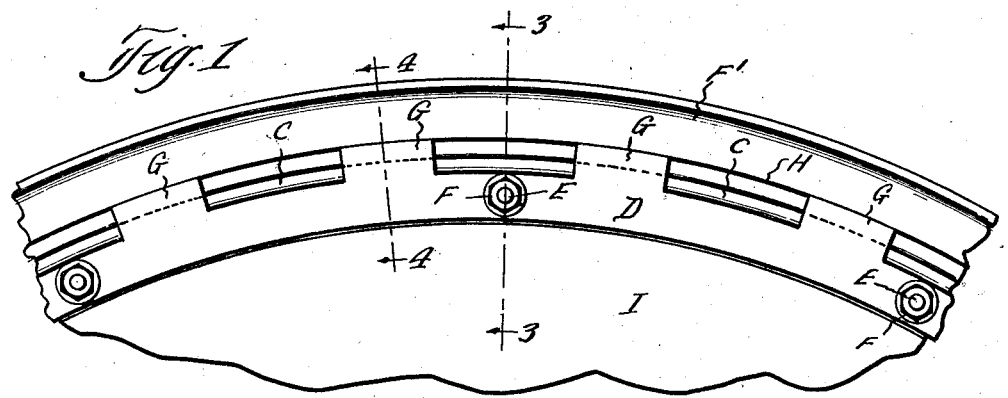
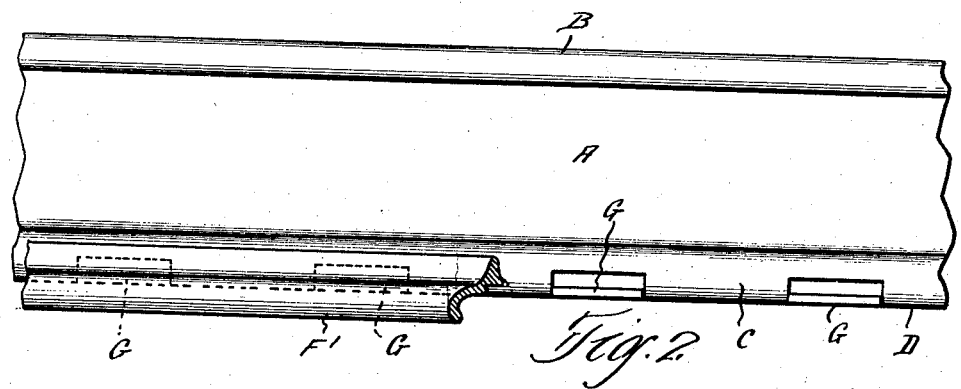
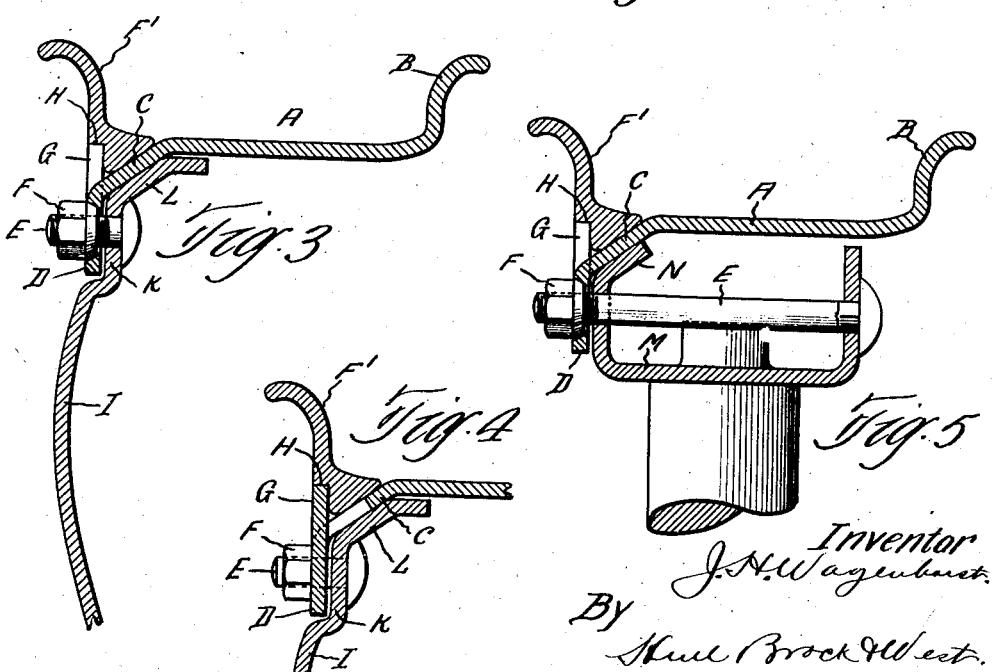
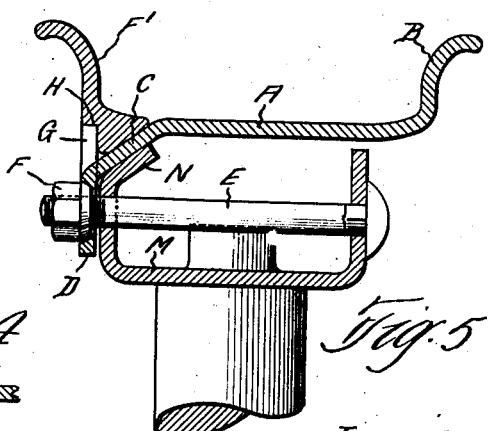
Inventor
J. H. Wagenhorst.
By
Hull Brock & West.
Attys.

Patented Apr. 13, 1926.

1,580,979

UNITED STATES PATENT OFFICE.

JAMES H. WAGENHORST, OF JACKSON, MICHIGAN.

RIM BASE AND DETACHABLE RING.

Application filed January 19, 1923. Serial No. 613,586.

*To all whom it may concern:*

Be it known that I, JAMES H. WAGENHORST, a citizen of the United States, residing at Jackson, in the county of Jackson and State of Michigan, have invented a certain new and useful Improvement in Rim Bases and Detachable Rings, of which the following is a full, clear, and exact description, reference being had to the accompanying drawings.

This invention relates generally to automobile-wheels and more particularly to a novel construction of rim base intended for use in connection with what is known as a quick detachable tire retaining ring.

The object of the invention is to provide a simple, efficient, and easily constructed form of rim base which can be employed upon a disk wheel body or a wheel body provided with a channeled sheet metal felly.

Another object of the invention is to provide a rim base embodying these characteristic features which can be quickly and easily applied to the wheel body of either type and tensioned during such connection.

Another object of the invention is to provide a rim base for use in connection with the usual type of demountable tire retaining flange ring but which will avoid the necessity of rolling the groove in the rim base such as has been heretofore employed, to receive the foot portion of the quick detachable ring.

With these objects in view, the invention consists in the novel features of construction and in the manner of combining or arranging the same, all of which will be described hereinafter and set forth in the appended claims.

In the drawings forming a part of this specification, Fig. 1 is a face view showing a portion of a disk provided with a rim base and quick detachable tire retaining flange ring constructed in accordance with my invention; Fig. 2 is a plan view of the rim base together with a portion of the flange ring partly in section; Fig. 3 is a vertical sectional view on the line 3—3 of Fig. 1; Fig. 4 is a vertical sectional view on the line 4—4 of Fig. 1; and Fig. 5 is a sectional view showing my improved form of rim applied to a channeled sheet metal felly.

In carrying out my invention, I provide a sheet metal rim comprising a flat base portion A which terminates at its inner side in the tire engaging flange B, which may be shaped for engagement with a straight side or clencher tire as preferred.

At the opposite side of the rim base A, the rim is bent or inclined inwardly as indicated at C, and then straight inwardly as shown at D and this inwardly projecting flange D is apertured at definite points to receive the fastening bolts E upon which the nuts F are screwed.

In connection with the rim base having the integral flange B, I propose to use a quick detachable flange ring F' made from a hot rolled section and this hot rolled section is rolled into the proper size ring, and divided at one point only; and the ring thus constructed has a certain inherent contractibility and the foot portion thereof is shaped for engagement with the inclined portion C and also with the spaced outwardly projecting ring retaining members G which are punched from the inclined portion C of the rim and extend outwardly in line with the flange D and the foot portion of the detachable ring rests between these outwardly projecting members G and the inclined portion C and it also will be noted that the ring F' is formed with an annular shoulder H which seats upon the outer edges of the members G.

A rim constructed as herein shown and described, lends itself particularly to quick and easy attachment to a disk wheel body as most clearly shown in Fig. 3, and also to a sheet metal felly as shown in Fig. 5. The metal disk I at its outer edge is slightly offset as indicated at K and is further formed with an inclined portion L upon which the inclined portion C of the rim rides and by virtue of the contact of these two tapering portions, the rim can be quickly and easily applied to and tensioned upon the disk wheel body, the fastening bolts E being passed through the offset portion K of the disk and the inwardly projecting flange portion D of the rim and the nuts F screwed to place.

In Fig. 5 the sheet metal felly M has its outer leg formed with an inclined flange N against which the inclined portion C of the rim bears when the rim is applied to said felly, the bolts E in this case extending through both the inner and outer legs of the felly and passing through the flange portion D of the rim exactly the same as when the rim is applied to the disk wheel body.

The detachable flange ring F' can be quickly and easily attached to and detached from the rim base, its inherent contractibility holding it in engagement with the inclined side and outwardly projecting members after it has once been applied, and the shape and size of the foot portion of said ring is such that when the tire is applied to the rim, and inflated, the internal pressure will serve to more firmly bind the rim base and the detachable flange ring in engagement with each other.

When it is desired to remove the tire, it is of course deflated and the outer bead is pushed inwardly so as to permit the removal of the detachable flange ring F', and then the tire can be drawn off from the rim base.

By punching out the ring engaging members, I provide an ample fastening connection and at the same time avoid the rolling of a groove at the side of the rim to receive the ring and this construction also permits the utilization of the inwardly projecting flange portion D for connecting the rim to the wheel body.

It will thus be seen that I provide a novel form of rim which can be quickly and easily applied to a wheel body and to which the ordinary construction of quick detachable ring can be applied without the aid of the ordinary continuous grooved edge of the rim.

Having thus described my invention, what I claim is:

1. A demountable rim comprising a rim base having a tire-engaging flange at one side and an inwardly-inclined portion at the other side, said portion having a plurality of members projecting outwardly from the inner edge thereof and a portion projecting inwardly from the inner edge thereof and provided with a plurality of bolt holes adapted to receive rim-securing bolts, and a detachable side flange ring seating on said inclined portion and the outer ends of said members.

2. A rim comprising a rim base, a tire-engaging flange at one side of said rim base, an inwardly-inclined portion at the other side of said rim base, a plurality of spaced lugs punched out from said inclined portion and pressed outwardly into the verical plane, and a detachable flange ring having a shoulder seating on the outer ends of said lugs and a foot lying against said inclined portion.

3. A demountable rim comprising a flange portion having bolt holes adapted to receive the rim securing bolts, an inclined portion adapted to seat upon an inclined portion of a wheel body, and a rim base terminating in a tire engaging flange, said inclined portion of the rim having outwardly projecting members punched therefrom, and a tire retaining ring having its inner portion shaped for engagement with the inclined portion of the rim and the outwardly projecting members.

4. A rim comprising a base portion having an outwardly projecting tire engaging flange at one side and an inwardly extending inclined portion at the opposite side, said rim also having an inwardly extending portion for attachment to a wheel body, and outwardly projecting members projecting from the inclined portion of the rim and a tire retaining ring having a shoulder adapted to seat upon the outer edges of said outwardly projecting members and also a portion fitting between said members and the inclined portion of the rim.

5. The combination with a wheel body having an inclined seat, of a rim comprising a flat base portion terminating in a tire engaging flange at one side and an inclined portion at the opposite side, said inclined portion being adapted to seat upon the inclined seat of the wheel body, said rim also having an inwardly extending flange portion adapted to be attached to the wheel body, and a plurality of spaced outwardly projecting members projecting from the inclined portion, and a tire retaining ring having a tire engaging flange, a foot portion adapted to fit between the outwardly projecting members and the inclined portion of the rim base and a shoulder engaging the outer edges of the outwardly projecting members.

6. The combination of a demountable rim having a rim base provided with a tire engaging flange at one side, an inclined portion and an inwardly extending flange at the other side and outwardly projecting members, and a detachable ring fitting between said outwardly projecting members and the inclined portion, said flange having bolt holes adapted to receive rim-securing bolts projecting laterally from a wheel body and said inclined portion of the rim being adapted to contact with an inclined portion of the wheel body.

In testimony whereof, I hereunto affix my signature.

JAMES H. WAGENHORST.